United States Patent
Fast et al.

(10) Patent No.: US 9,920,828 B2
(45) Date of Patent: Mar. 20, 2018

(54) DIFFERENTIAL WITH LUBRICANT CONTROL

(71) Applicant: Ford Global Technologies, LLC, Dearborn, MI (US)

(72) Inventors: Mathew John Fast, Dearborn Heights, MI (US); Sunil Katragadda, Canton, MI (US); Danrich Henry Demitroff, Okemos, MI (US); W. Cary Cole, Wixom, MI (US); Michael Levin, Ann Arbor, MI (US); Furqan Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/193,800

(22) Filed: Jun. 27, 2016

(65) Prior Publication Data
US 2017/0370465 A1   Dec. 28, 2017

(51) Int. Cl.
*F16H 57/037* (2012.01)
*F16H 57/04* (2010.01)
*F16H 48/08* (2006.01)

(52) U.S. Cl.
CPC ......... *F16H 57/0412* (2013.01); *F16H 48/08* (2013.01); *F16H 57/037* (2013.01); *F16H 57/045* (2013.01); *F16H 57/0457* (2013.01); *F16H 57/0483* (2013.01); *F16H 57/042* (2013.01)

(58) Field of Classification Search
CPC .... F16H 57/037; F16H 57/412; F16H 57/045; F16H 57/047; F16H 57/0483; F16H 48/08
See application file for complete search history.

(56) References Cited

U.S. PATENT DOCUMENTS

| | | | | |
|---|---|---|---|---|
| 4,923,115 A | * | 5/1990 | Sekoguchi | G05D 23/136 137/88 |
| 6,105,379 A | * | 8/2000 | Alsenz | F25B 41/062 236/92 B |
| 6,299,561 B1 | * | 10/2001 | Kramer | F16H 57/0447 184/13.1 |
| 6,997,284 B1 | | 2/2006 | Nahrwold | |
| 8,429,895 B2 | * | 4/2013 | Kawazu | F01N 3/0205 60/278 |

(Continued)

*Primary Examiner* — Jacob S. Scott
*Assistant Examiner* — Tinh Dang
(74) *Attorney, Agent, or Firm* — James Dottavio; Brooks Kushman P.C.

(57) ABSTRACT

A system for regulating lubricant temperature within a vehicle axle is provided. A differential housing has a primary chamber that contains the differential, and a secondary chamber separated from the primary chamber. A sump is in the primary chamber for collecting lubricant. An inlet to the secondary chamber allows the lubricant to flow from the primary chamber into the secondary chamber. An outlet to the secondary chamber allows the lubricant stored therein to be purged into the sump. When the lubricant is below a certain threshold temperature, a temperature-responsive valve is configured to close to inhibit the fluid to travel through the outlet. When the temperature of the lubricant rises to exceed the threshold, the valve is configured to open and permit the fluid to travel through the outlet.

20 Claims, 3 Drawing Sheets

(56) References Cited

U.S. PATENT DOCUMENTS

| | | |
|---|---|---|
| 8,707,826 B2 | 4/2014 | Jacobs et al. |
| 9,458,922 B2 * | 10/2016 | Paielli .................. F16H 57/045 |
| 2015/0285369 A1 | 10/2015 | Benson et al. |
| 2016/0053911 A1 * | 2/2016 | Klein ..................... F16K 31/02 |
| | | 137/625.45 |

* cited by examiner

DIFFERENTIAL WITH LUBRICANT CONTROL

TECHNICAL FIELD

This disclosure relates to a differential in an automotive vehicle. More particularly, this disclosure involves a system for removing a portion of the lubricant within a differential to improve churning losses and fuel efficiency.

BACKGROUND

Differentials in motor vehicles have been used for many years to transfer power from one driving member (e.g., drive shaft) to two wheels via axle shafts. Differentials can include rings gears that engage corresponding gears of the driving member to change the direction of the rotational force. The ring gears typically operate with lubricant to reduce friction and heat with the meshing parts.

SUMMARY

According to one embodiment, a system for regulating lubricant temperature within a vehicle axle is provided. The system includes a housing having a primary chamber containing a differential, a sump in the primary chamber for collecting lubricant, and a secondary chamber having an inlet for receiving the lubricant from the primary chamber and an outlet for purging the lubricant into the sump. A valve is at the outlet and is configured to open in response to a temperature of the lubricant exceeding a threshold.

The primary chamber and the secondary chamber may be separated by a wall. The differential may include a ring gear having a perimeter, and the wall may be rounded to follow the shape of the perimeter.

A shoulder may extend into the primary chamber at the inlet to direct the lubricant into the inlet.

The valve may be configured to close in response to the temperature decreasing from greater than the threshold to less than the threshold.

The secondary chamber may be located rearward of the differential in the vehicle and may be at least partially defined by a rearward wall of the housing. The rearward wall may be separately attached to a primary exterior wall that defines the primary chamber.

According to another embodiment, a vehicle includes a differential and a housing having a primary chamber containing the differential and fluid. A secondary chamber is adjacent the primary chamber and has an inlet in fluid communication with a first region of the primary chamber and an outlet in selective fluid communication with a second region of the primary chamber. A valve is configured to selectively permit fluid to flow through the outlet in response to a temperature of the fluid exceeding a threshold.

According to yet another embodiment, a method includes operating a ring gear of a differential within a primary chamber of a housing to cause lubricant to enter a secondary chamber of the housing. The method further includes storing the lubricant in the secondary chamber while a temperature of the lubricant is less than a threshold. The method further includes releasing the lubricant from the secondary chamber to the primary chamber in response to the temperature exceeding the threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
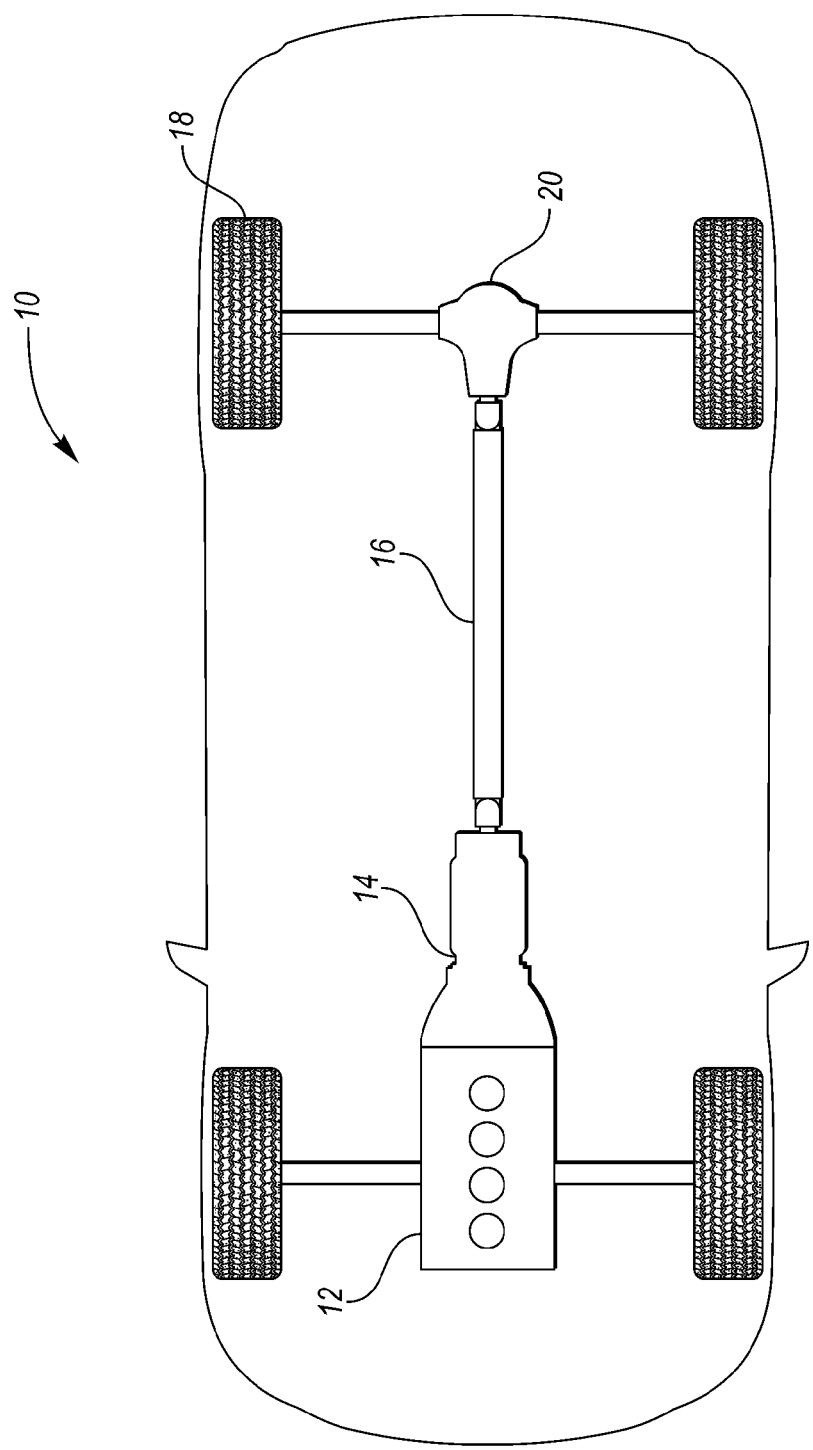
FIG. 1 is a schematic of an exemplary vehicle having a differential of the present disclosure.
Figure 2:
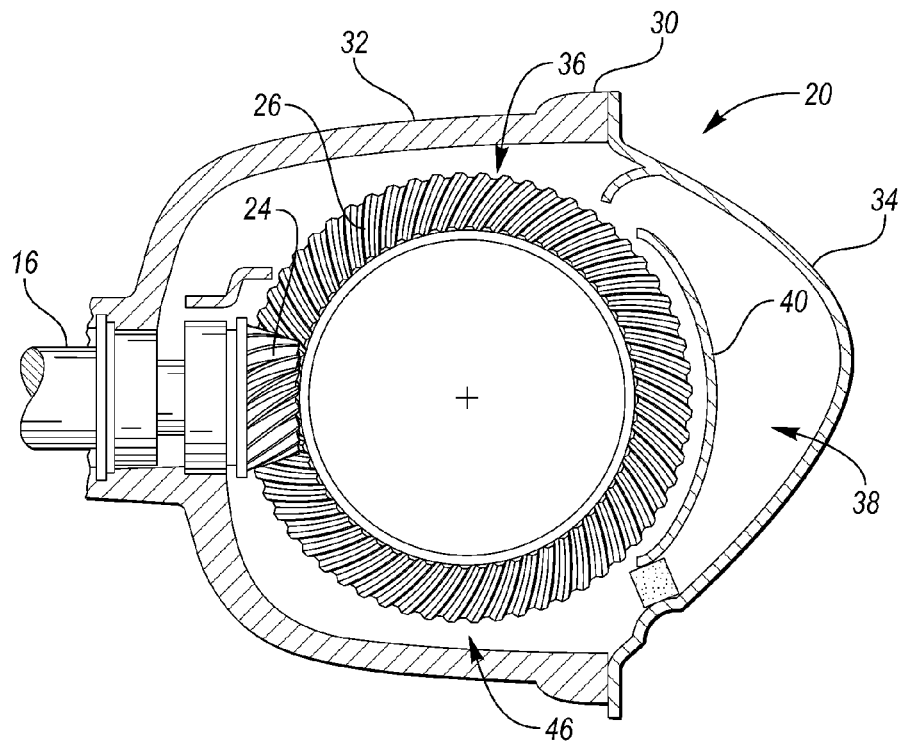
FIG. 2 is a cross-sectional view of the differential of FIG. 1 with any fluid removed to show the mechanical components.

FIG. 1 illustrates one embodiment of a vehicle 10 incorporating the inventive concepts described below. In this embodiment, the vehicle 10 has an engine 12 that delivers power to a transmission 14 to turn a drive shaft 16 that transfers power toward the rear wheels. The transmission 14 can be a step-ratio transmission, a continuously-variable transmission (CVT), or other types known. In other embodiments, the vehicle is a hybrid vehicle that also (or alternatively) includes an electric motor that can provide power to the rear wheels.

The drive shaft 16 provides power to a differential 20. In the embodiment shown in FIG. 1, the differential 20 is a rear differential that distributes power to the rear left and right wheels 18. The differential 20 allows the two wheels to spin at different speeds to allow, for example, the vehicle to travel around corners with the outside wheel covering more ground (and therefore spinning faster) than the inside wheel.

One embodiment of the differential 20 is shown in FIGS. 2-5. According to this embodiment, the drive shaft 16 is operative to rotate a pinion gear 24 which, in turn, rotates a ring gear 26. The pinion gear 24 has teeth which meshingly engage corresponding teeth of the ring gear 26. This allows rotational power to change directions (e.g., 90 degrees) from the drive shaft 16 and begin flowing toward the wheels.

The differential 20 is contained within a housing 30. In one embodiment, the housing 30 includes a first exterior wall 32 and a separate second exterior wall 34 that are joined together during manufacturing via welding, fasteners, etc. In one embodiment, the housing can refer to just the portion of the differential enclosure that is made up of the first exterior wall 32, and a chamber (as described below) can refer to a separate portion adjacent to the housing.

During operation of a typical differential, the lubricant inside the differential is splashed forward towards the front head of the differential due to the spinning ring gear being immersed in the lubricant in the sump of the differential. The immersion of the ring gear in the fluid can increase churning losses under low ambient conditions when the fluid viscosity is high. Due to the heightened viscosity, the paddle wheel effect of the ring gear causes an increase in losses in the differential, increasing vehicle fuel consumption.

According to various embodiments of the present disclosure, a secondary chamber is provided within the differential housing (or adjacent the differential housing). The secondary chamber stores at least some of the splashed lubricant to remove some of the lubricant from the sump to decrease churning losses under low ambient conditions. The lubricant stored in the secondary chamber is released back into the primary chamber in response to the lubricant reaching a predetermined temperature, indicating a lower viscosity of the lubricant and thus more preferable operating conditions.

According to at least one particular embodiment, the housing 30 defines a primary chamber 36 and a secondary chamber 38. The primary chamber is a chamber, cavity, pocket, or the like that is sized and configured to contain the differential components such as the ring gear 26. There is clearance within the walls 32 of the primary chamber 36 to account allow for lubricant to flow therethrough. The secondary chamber 38 is adjacent to the primary chamber 36. In one embodiment, the primary chamber 36 and the secondary chamber 38 are separated or partitioned by a partition wall 40. The partition wall 40 may be curved to follow the shape of the ring gear 26. This directs the lubricant during operation of the differential, as will be described below.

The secondary chamber 38 is located rearward of the primary chamber 36, with respect to a rearward direction of the vehicle. This chamber 38 stores lubricant as it is splashed by the ring gear, as will be described below.

Figure 3:
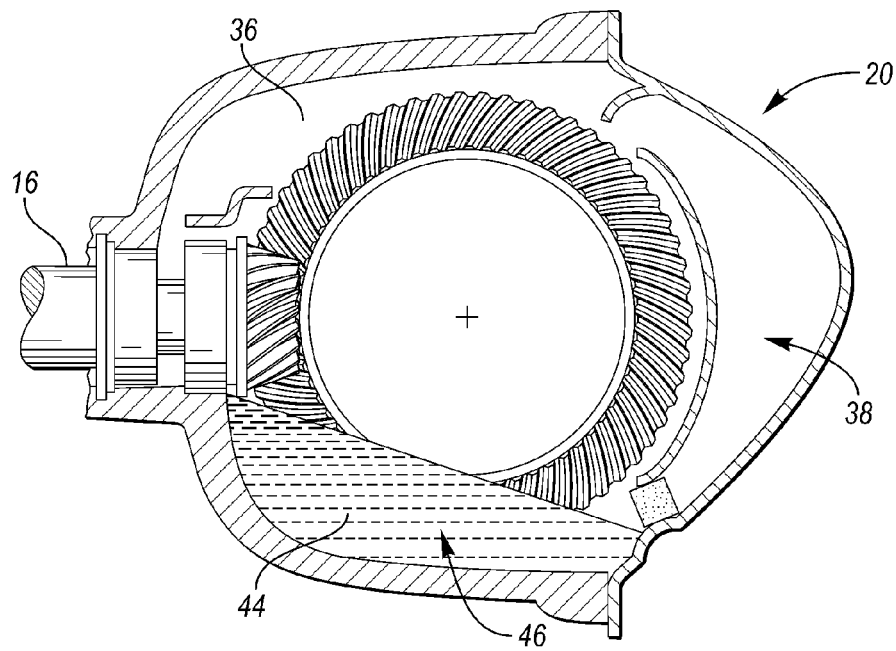
FIG. 3 is a cross-sectional view of the differential of FIG. 1 with fluid maintained in a sump of a primary chamber of the differential housing.

FIG. 3 shows the differential with fluid or lubricant 44 in a bottom portion (e.g., sump 46). In this figure, the vehicle is stationary and all of the fluid (save some residual fluid) is held in the sump 46 of the primary chamber 36.

Figure 4:
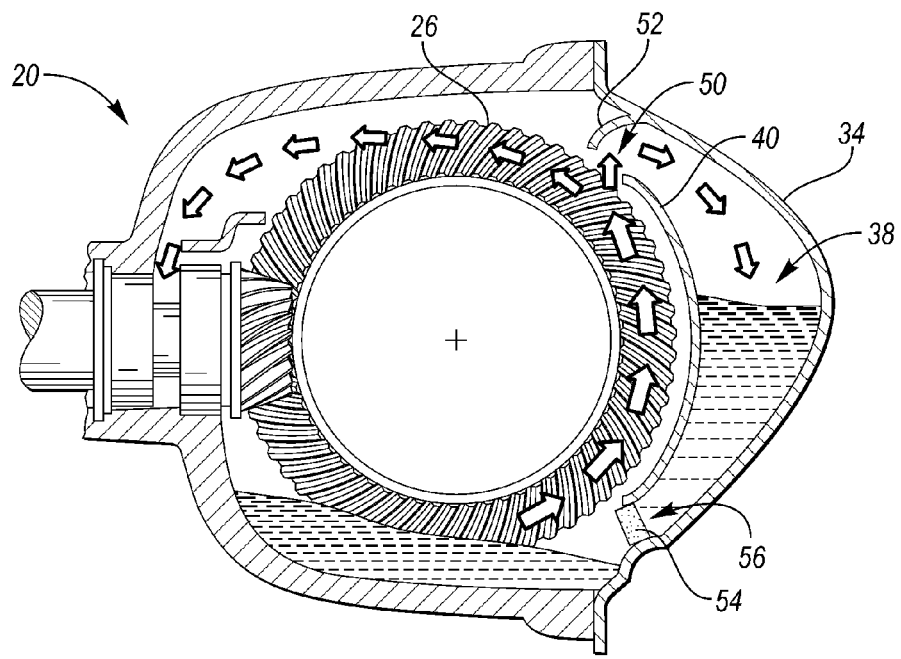
FIG. 4 is a similar cross-sectional view of the differential, with arrows representing rotational movement of a ring gear which causes fluid to splash into a secondary chamber.

FIG. 4 shows the differential being operated in relatively low ambient temperatures causing a relatively high viscosity of the lubricant 44. As the ring gear 26 spins, some of the lubricant 44 is splashed or otherwise directed over the partition wall 40 and into the secondary chamber 38 through a region defining an inlet 50 of the secondary chamber 38. This is represented by the arrows shown in the Figure. To aid in directing fluid into the secondary chamber, a curved flange or shoulder 52 extends from the second exterior wall 34. In some embodiments, the shoulder 52 extends over the partition wall 40 and into the primary chamber 36. As the ring gear 26 is rotated (counter-clockwise in FIG. 4), the shoulder 52 catches and directs some of the fluid to enter through the inlet 50.

Figure 5:
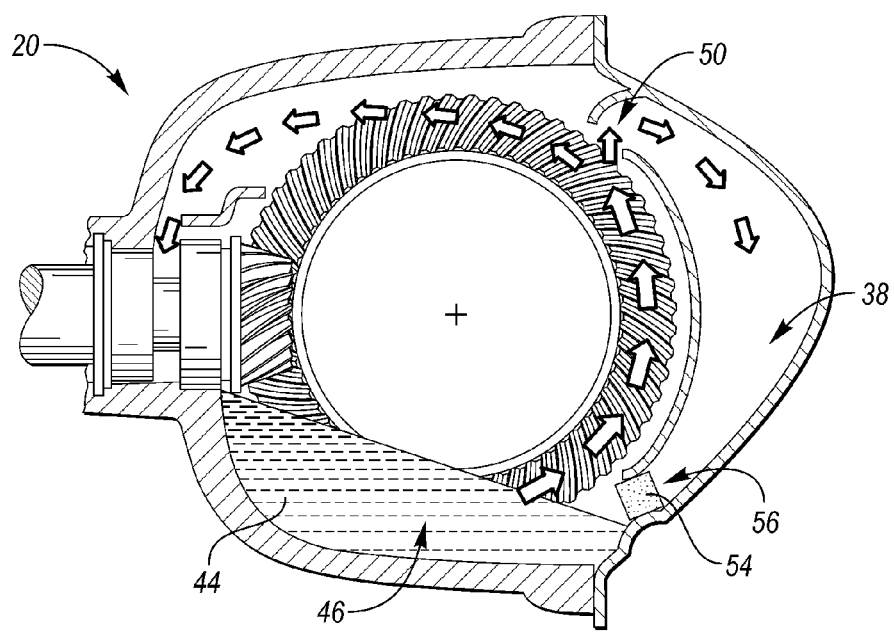
FIG. 5 is a similar cross-sectional view of the differential, with a valve opening to release the fluid from the secondary chamber back into the sump.

A valve 54 is located at an outlet 56 of the secondary chamber 38 at an opposing end of the secondary chamber 38 from the shoulder 52. The valve 54 selectively inhibits the lubricant in the secondary chamber 38 from re-entering the primary chamber 36. In one embodiment, the valve 54 remains closed when the temperature of the lubricant is below a predetermined temperature threshold. This removes some of the lubricant from the primary chamber 36 during times of heightened viscosity of the lubricant when temperatures are relatively low. Then, in response to the temperature of the lubricant exceeding the predetermined temperature threshold, the valve 54 opens to allow the fluid to drain back into the primary chamber 36 at the sump 46. This is shown in FIG. 5, in which the valve 54 has opened and the sump 46 has re-filled with the lubricant. This allows more of the lubricant to act on the ring gear 26 during times when the viscosity has reduced to preferential operating conditions.

In one embodiment, the valve 54 is a wax thermostatic element (i.e., wax motor thermostat valve). The thermal properties of the wax in the thermostatic element cause expansion and contraction of the wax itself, which causes a corresponding opening and closing of the valve 54. The properties of the wax can be such that the valve 54 opens and closes when the surrounding lubricant causes a phase change in the wax at a certain temperature.

In another embodiment, a separate thermostat is disposed in or around the differential to detect the temperature of the lubricant in the differential. The thermostat sends temperature signals to a controller (e.g., microprocessor) that opens a closes the valve in response to the temperature signals exceeding or falling below associated thresholds.

The embodiments described above allow a reduced amount of lubricant to be utilized during cold ambient temperature. Then, once the temperature of the lubricant raises, more lubricant can be added to the sump and primary chamber without undesirably high churning losses. The thermostatic element can be tuned based on the lubricant quantity needed to minimize durability issues on the differential.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for regulating lubricant temperature within a vehicle axle, comprising:
   a housing having
      a primary chamber containing a differential, and
      a secondary chamber having an inlet for receiving lubricant from the primary chamber, and an outlet; and
   a valve at the outlet configured to open and purge the lubricant from the secondary chamber, through the valve and directly back into the primary chamber in response to a temperature of the lubricant exceeding a threshold.

2. The system of claim 1, wherein the primary chamber and secondary chamber are separated by a wall.

3. The system of claim 2, wherein the differential includes a ring gear having a perimeter, and the wall is rounded to follow the perimeter of the ring gear.

4. The system of claim 1 further comprising a shoulder at the inlet extending into the primary chamber to direct the lubricant into the inlet.

5. The system of claim 1, wherein the valve is configured to close in response to the temperature decreasing from greater than the threshold to less than the threshold.

6. The system of claim 1, wherein the secondary chamber is located rearward of the differential in the vehicle and is at least partially defined by a rearward wall of the housing.

7. The system of claim 1, wherein the primary chamber includes a sump for collecting lubricant, wherein the valve is located at a barrier between the secondary chamber and the sump such that the outlet purges the lubricant directly into the sump through the valve.

8. The system of claim 1, wherein the valve directly connects and separates the secondary chamber from the primary chamber.

9. A vehicle comprising:
a differential;
a housing having a primary chamber containing the differential and fluid;
a secondary chamber adjacent the primary chamber and having an inlet in fluid communication with a first region of the primary chamber and an outlet in selective fluid communication with a second region of the primary chamber; and
a valve configured to selectively permit fluid to flow from the outlet, through the valve, and directly into the second region in response to a temperature of the fluid exceeding a threshold.

10. The vehicle of claim 9, wherein the primary chamber and the secondary chamber are partitioned by a wall.

11. The vehicle of claim 10, wherein the differential includes a ring gear having a circumference, and the wall is rounded to follow the circumference.

12. The vehicle of claim 10, wherein the primary chamber is defined between a first exterior wall of the housing and the wall, and the secondary chamber is defined between a second exterior wall of the housing and the wall, wherein the first exterior wall and the second exterior wall are secured to one another.

13. The vehicle of claim 10, wherein the housing and the secondary chamber share a common exterior wall.

14. The vehicle of claim 13, further comprising a shoulder extending inward from the exterior wall and overlapping a portion of the inlet to direct fluid into the inlet.

15. The vehicle of claim 9, wherein the valve is configured to close in response to the temperature decreasing from greater than the threshold to less than the threshold.

16. The vehicle of claim 9, wherein the valve is a wax thermostat valve.

17. The vehicle of claim 9, wherein the secondary chamber is located rearward of the housing relative to the vehicle.

18. A method comprising:
operating a ring gear of a differential within a primary chamber of a housing to cause lubricant to enter a secondary chamber of the housing;
storing the lubricant in the secondary chamber while a temperature of the lubricant is less than a threshold; and
releasing the lubricant from the secondary chamber, through a valve and directly to the primary chamber in response to the temperature exceeding the threshold.

19. The method of claim 18, wherein releasing the lubricant includes opening the valve.

20. The method of claim 18, wherein the primary chamber and the secondary chamber are partitioned by a single wall.

* * * * *